(12) United States Patent
Abdallah et al.

(10) Patent No.: US 7,761,694 B2
(45) Date of Patent: Jul. 20, 2010

(54) EXECUTION UNIT FOR PERFORMING SHUFFLE AND OTHER OPERATIONS

(75) Inventors: Mohammad Abdallah, Folsom, CA (US); Hon Shing Lau, El Dorado Hills, CA (US); Shou-Wen Fu, Folsom, CA (US); Aviel Timor, Haifa (IL); Tal Gat, Haifa (IL)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 11/478,884

(22) Filed: Jun. 30, 2006
(Under 37 CFR 1.47)

(65) Prior Publication Data
US 2008/0215855 A1    Sep. 4, 2008

(51) Int. Cl.
G06F 7/38 (2006.01)
G06F 7/00 (2006.01)
(52) U.S. Cl. ........................ 712/221; 708/209
(58) Field of Classification Search ................. 708/209; 712/221
See application file for complete search history.

(56) References Cited

U.S. PATENT DOCUMENTS

| | | | | |
|---|---|---|---|---|
| 3,812,467 A | * | 5/1974 | Batcher | 712/300 |
| 4,139,899 A | * | 2/1979 | Tulpule et al. | 712/224 |
| 5,844,825 A | * | 12/1998 | Wang et al. | 708/209 |
| 6,041,404 A | | 3/2000 | Roussel et al. | 712/210 |
| 6,115,812 A | * | 9/2000 | Abdallah et al. | 712/300 |
| 6,122,725 A | | 9/2000 | Roussel et al. | 712/200 |
| 6,243,728 B1 | * | 6/2001 | Farooqui et al. | 708/209 |
| 6,304,956 B1 | * | 10/2001 | Tran | 712/221 |
| 6,952,478 B2 | * | 10/2005 | Lee et al. | 380/37 |
| 6,970,994 B2 | | 11/2005 | Abdallah et al. | 712/22 |

FOREIGN PATENT DOCUMENTS

WO    WO 01/67235 A2    9/2001

OTHER PUBLICATIONS

Pillmeier, Matthew R., Schulte, Michael J., Walters III, E. George. "Design alternatives for barrel shifters" Advanced Signal Processing Algorithms, Architectures, and Implementations XII. Edited by Luk, Franklin T. Proceedings of the SPIE, vol. 4791, pp. 436-447, Dec. 2002.*
Intel, "IA-32 Intel® Architecture Software Developer's Manual—vol. 2B—Instruction Set Reference, N-Z—SHUFPD—Shuffle Packed Double-Precision Floating-Point Values," 2004, pp. 265 to 270.
Intel, "IA-32 Intel® Architecture Software Developer's Manual; vol. 2B—Instruction Set Reference, N-Z ; PSHUFD—Shuffle Packed Doublewords," 2004, pp. 124 to 131.
State Intellectual Property Office, P.R. China, Second Office Action dated Mar. 13, 2009 in a related application.
State Intellectual Property Office, P.R. China, Third Office Action dated Jul. 24, 2009, issued in a related application.

* cited by examiner

*Primary Examiner*—Eddie P Chan
*Assistant Examiner*—Jacob Petranek
(74) *Attorney, Agent, or Firm*—Trop, Pruner & Hu, P.C.

(57) ABSTRACT

In one embodiment, the present invention includes a method for receiving first and second data operands in a common execution unit and manipulating the operands responsive to an instruction to generate an output according to local control signals of a local controller of the execution unit. Various instruction types such as shuffle and shift operations may be performed in the common execution unit in a single cycle. Other embodiments are described and claimed.

24 Claims, 5 Drawing Sheets

EXECUTION UNIT FOR PERFORMING SHUFFLE AND OTHER OPERATIONS

BACKGROUND

Microprocessors may include various execution units to perform operations on data. Such execution units may include arithmetic logic units (ALU's), floating point, integer, and other specialized execution units. To improve the efficiency of multimedia applications among other applications, a single instruction multiple data (SIMD) architecture may enable one instruction to operate on several data simultaneously, rather than on a single data. With parallel hardware execution, multiple operations can be performed with a single instruction, improving performance.

To enable various operations to take advantage of such architectures, so-called shuffle operations may be performed on packed data residing in a register or other location to rearrange the data elements prior to other operations such as SIMD operations. Still other instructions cause data in one or more locations to be shifted by a given amount to provide a desired result. Some processors include multiple units to perform shuffle operations on larger data operands, e.g., 128-bit operands. By requiring the use of multiple units, increased real estate in terms of a chip's area as well as increased power consumption during operation occurs. Furthermore, other operations such as shift operations are performed in different execution units, requiring additional expenses in terms of area and power consumption.

Shuffle-based instructions (among other instructions) may be performed using sub-instruction operations, such as micro operations (μops) in some instruction set architectures, to enable operations that are needed to obtain a desired result. Such μops may include shuffling, insertions, shifting, concatenating, packing, unpacking and the like. Furthermore, different flavors of such instructions may be used to support different data granularities of data. Given all of this, a variation in control and data path requirements may exist. Accordingly, multiple execution units may be needed to perform these operations and it may take multiple μops and machine cycles to perform these operations. Thus power requirements are raised and undesirable latencies occur.

DETAILED DESCRIPTION

Embodiments of the invention relate to processor-based systems, and more particularly to execution units within a processor or other processing engine.

In various embodiments, a single execution unit can handle various shuffle-related and other instructions via a single micro operation (μop). While the scope of embodiments the invention is not limited in this regard, in various implementations, the execution unit may be sized to handle 128-bit operands and furthermore may be configured to support multiple instruction widths including, for example, 64-bit instructions such as 64-bit multimedia extension (MMX) instructions and 128-bit single instruction multiple data (SIMD) instructions. Using this execution unit, for example, various instructions to perform different shuffle-like functions, including shuffle operations on various forms of data, shift operations, as well as other arithmetic operations can be performed in a single machine cycle responsive to one μop or instruction, depending upon the architecture. For example, in various embodiments, instructions of an instruction set architecture (ISA), such as available in an Intel® architecture (IA-32) processor, extensions thereto, or other ISAs may be performed. More so, embodiments of the present invention provide for performance of instructions of different data granularities, such as byte, word, double word, and quadword. In one embodiment, in which instructions are decoded into sub-instructions, such as uops, instructions may be executed by performing a single μop in a single processing cycle in a single execution unit or multiple parallel execution units. For the purpose of this disclosure the terms "uop" and "instruction" may be used interchangeably, unless referring to a specific processor architecture, in which instructions may be decoded into sub-instructions, such as uops.

Figure 1:
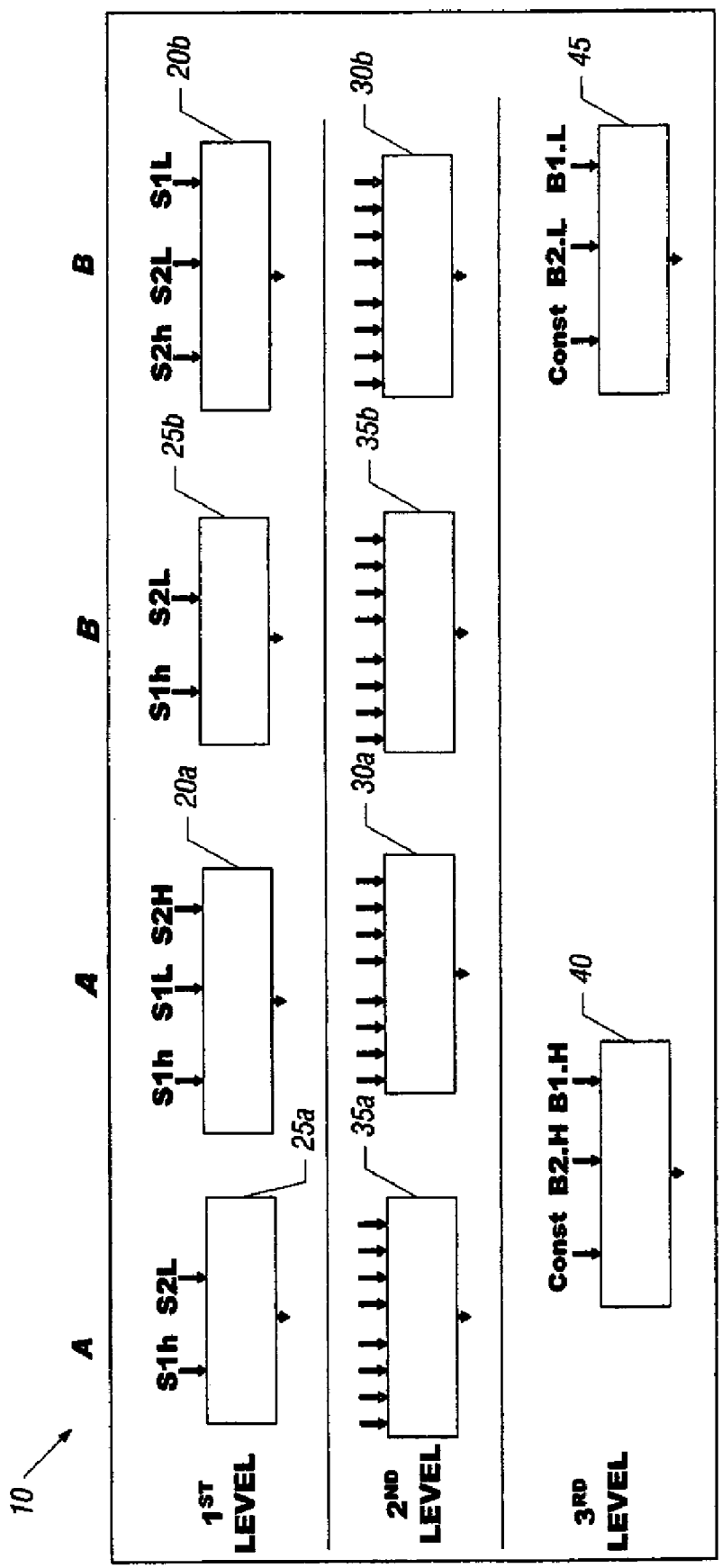
FIG. 1 is a block diagram of a high-level view of a shuffle unit in accordance with one embodiment of the present invention.

Referring now to FIG. 1, shown is a block diagram of a high-level view of a shuffle unit in accordance with one embodiment of the present invention. As shown in FIG. 1, shuffle unit 10 includes multiple levels of selectors such as multiplexers or other selection mechanisms. In the embodiment of FIG. 1, shuffle unit 10 may have two independent data paths, namely a first data path A and a second data path B. Each independent data path is coupled to receive at least portions of a first source operand (i.e., S1) and a second source operand (i.e., S2). Specifically, as shown in FIG. 1, a first level of selectors includes a first selector 20a and a second selector 25a. While shown as single selectors for ease of illustration, it is to be understood that a plurality of first selectors 20a and second selectors 25a may be present. As shown, first selector 20a is coupled to receive three inputs and provide a single output (i.e., a 3:1 selection). Specifically, first selector 20a is coupled to receive both high and low portions of first source operand S1 and a high portion of second source operand S2. Second selector 25a is coupled to receive a high portion of first source operand S1 and a low portion of second source operand S2. Similarly, the first level of selectors includes a first selector 20b and a second selector 25b. As shown, these selectors are coupled to receive, respectively, high and low portions of second source operand S2 and a low portion of first operand S1 (in first selector 20b), and a high portion of first source operand S1 and a low portion of second source operand S2 (in second selector 25b). While shown with this particular implementation of first level selectors in the embodiment of FIG. 1, it is to be understood that the scope of the present invention is not limited in this regard.

Still referring to FIG. 1, the outputs of the selectors of the first level may be coupled to inputs of a plurality of selectors of a second level. Specifically, a first selector 30a of the second level is coupled to receive outputs from first selector 20a of the first level, while a second selector 35a of the second level is coupled to receive outputs from second selector 25a of the first level. As shown, first selector 30a and second selector 35a of the second level may be 8:1 selectors. A similar first selector 30b and a second selector 35b may be coupled to receive the outputs of first selector 20b and second selector 25b of the first level.

In various implementations, to ease timing constraints and enable execution of shuffle-based operations in a single cycle, the full extent of the data operands, i.e., all bits of both source operand S1 and source operand S2 may be provided to both data paths. In this way, more time is allowed for decoding operations on the μop and related control information, e.g., immediate data, to control the lower portions of the data paths. Further, the selections performed by the first level selectors may be controlled by control signals based on a type of operation that is to be performed. That is, these first level selectors prepare incoming data based on the nature of the functionality (e.g., shuffle or shift) but do not select data based on full control information associated with an instruction, e.g., immediate data. Instead, greater portions of the immediate data may be used to control selections performed in the second level and lower levels of selectors. Note that the control information may take the form of global control information or local control information. That is, depending on a type of instruction the data paths may be controlled globally or locally. For example, based on one piece of control information all data fields may be controlled similarly. One example of such global control is a shift control. Immediate data or other control information may provide a shift amount that is applied across all data fields and accordingly, such global control signals may be applied equally to selectors of at least lower levels of shuffle unit 10. As will be described further below, such global control signals may be mapped to local control signals that are coupled to the various selectors.

For other instructions such as shuffle instructions, local control information, e.g., from immediate data may be used. More specifically, local control signals may be provided in which each data field receives different control information. The selectors of at least lower levels of shuffle unit 10 may thus be controlled according to these local signals. In other words, global control signals match relative position selection while local control signals match absolute position selection. To effect these disparate instructions in a single execution unit, the selectors of shuffle unit 10 may be controlled using local control signals, thus supporting a variety of shuffle-related instructions. However to further enable shift-like instructions execution in shuffle unit 10, logic may be provided to map global signals onto these local signals. Accordingly, a generic shuffle architecture is provided that can perform a variety of different instructions in a single μop.

Still referring to FIG. 1, the outputs of the second level selectors may be coupled to inputs of a third level of selectors. Specifically, as shown in FIG. 1 a third level selector 40 is coupled to receive the outputs of both first selector 30a and second selector 35a (i.e., B2H and B1H) of the second level. Furthermore, selector 40 is further coupled to receive a constant value (i.e., Const), which may be generated based on control signals received with an instruction to enable passing of a selected constant or special value. While shown with a single selector 40, it is to be understood that in a given implementation, multiple selectors may be present in a third level to implement the 3:1 selection operation shown. In some implementations, instead of a 3:1 selector, a data manipulation unit may be coupled between the second and third levels of selectors to enable implementation of the third level of selectors with 2:1 selectors. As further shown in FIG. 1, a third level selector 45 receives the outputs of second level selectors 30b and 35b (i.e., B2L and B1L) and a constant value. While shown with this particular implementation in the embodiment of FIG. 1, it is to be understood that the scope of the present invention is not limited in this regard.

Figure 2:
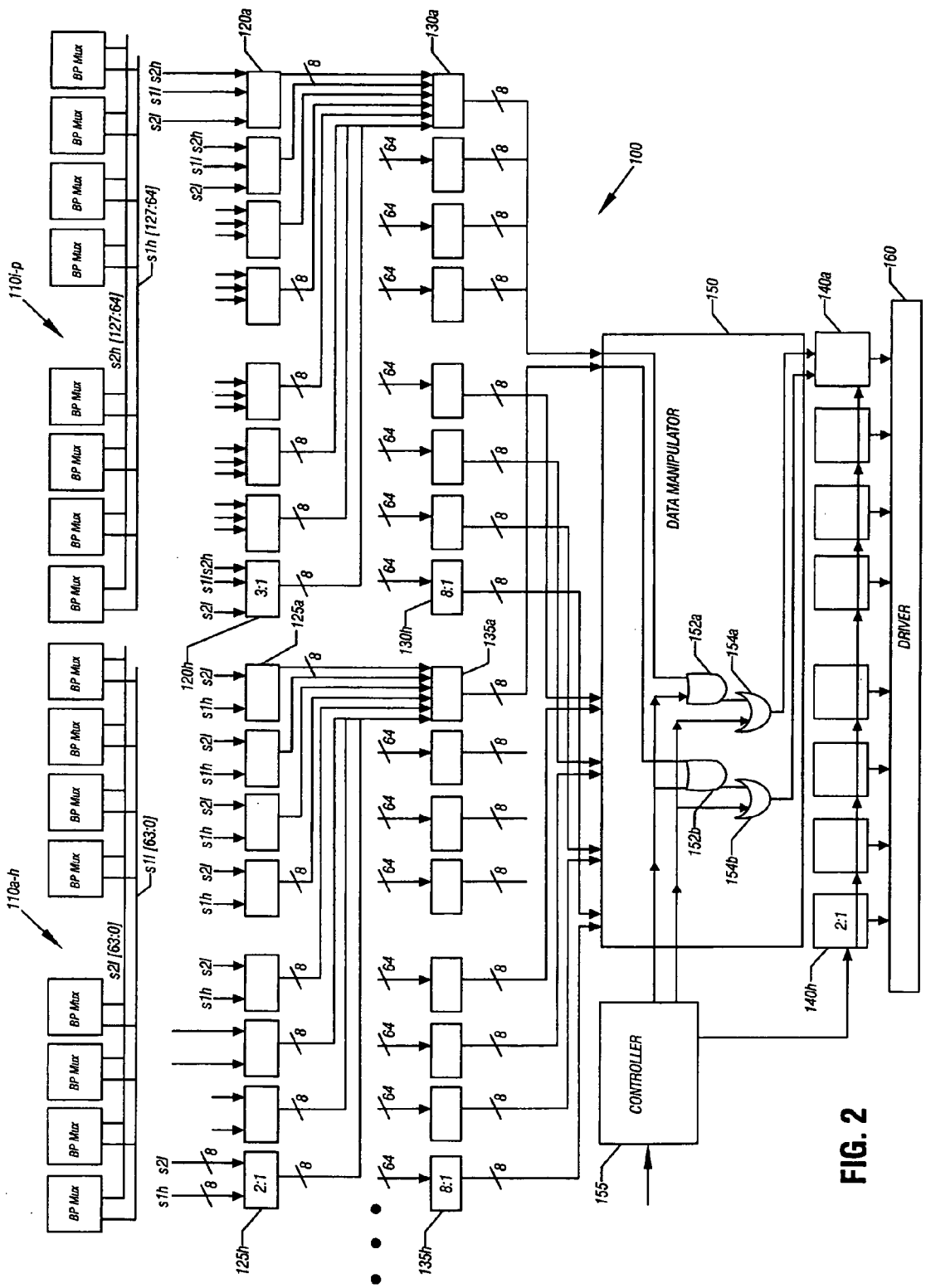
FIG. 2 is a block diagram of a more detailed view of a portion of a shuffle unit in accordance with one embodiment of the present invention.

While FIG. 1 shows a high level block diagram of an overall structure of a shuffle unit, referring now to FIG. 2, shown is a block diagram of a more detailed view of a portion of a shuffle unit in accordance with one embodiment of the present invention. As shown in FIG. 2, an execution unit 100 is shown. At a high level, execution unit 100 includes a first level of selectors which includes first multiplexers $120_a$-$120_h$ (generically first multiplexer (mux) 120) and second multiplexers $125_a$-$125_h$ (generically second multiplexer 125). In various implementations, first multiplexers 120 and second multiplexers 125 may be controlled based on given functionality of an instruction to be performed such as a shift or shuffle operation. Thus control of these multiplexers does not depend on the full control bits, e.g., of immediate data provided with an instruction. As shown, each of first multiplexers 120 and second multiplexers 125 are coupled to receive various byte-level portions of first and second source operands S1 and S2, which are provided to these multiplexers via a set of bypass multiplexers $110_a$-$110_p$ (generically bypass multiplexer 110). Note that bypass multiplexers 110 provide all of the first and second source operands to the first level multiplexers. Note that shuffle unit 100 shown in FIG. 2 is only half of a shuffle unit. That is, an identical, independent data path may be present for the other portions of operands S1 and S2 (as represented by the dots on the left side of FIG. 1), such as shown in the high level data paths A and B of FIG. 1.

Still referring to FIG. 2, the outputs of first multiplexers 120 and second multiplexers 125 are coupled to a plurality of second level selectors that includes third multiplexers $130_a$-$130_h$ (generically third multiplexers 130) and fourth multiplexers $135_a$-$135_h$ (generically fourth multiplexers 135). These second level multiplexers may be controlled based on local control signals to enable implementation of shifts or shuffles, among other operations.

For operations controlled by global signals, e.g., shift operations, global signals may be mapped onto local signals that are then provided to control third multiplexers 130 and fourth multiplexers 135. More specifically, as shown in FIG. 2, execution unit 100 includes a controller 155. Controller 155 may be a microcontroller, programmed logic, firmware, software, hardware, or combinations thereof. Controller 155 may be used to receive incoming control signals associated with an instruction (i.e., a μop and full control information (e.g., immediate data from an immediate bus)) and to generate control signals for controlling the second level selectors, as well as a third level of selectors (as will be described further below). In various implementations, controller 155 may be adapted to perform mapping of global control signals onto local control signals. That is, depending on a type of instruction, controller 155 may receive incoming global signals which it in turn maps onto local control signals that are coupled to the various selectors of the second and third level of selectors (i.e., on a data field basis).

The outputs of the second level selectors may be coupled to a data manipulator 150. In various implementations, data manipulator 150 may be used to perform various logic operations on the incoming data. In this way, the size and expense (i.e., power consumption and timing) associated with using a 3:1 multiplexer for a third level of selectors may be avoided. In general, data manipulator 150 may be implemented to select the incoming data or a special value (such as a constant). That is, data manipulator 150 may generate constant values to avoid the need for 3:1 multiplexers in a third level. Specifically as shown in FIG. 2, data manipulator 150 includes a first logic gate 152a, which may be an AND gate that is coupled to receive an output from a corresponding one of third multiplexers 130 and an output from controller 155. This output may correspond to a predetermined value, which may be all ones or all zeros, depending on a particular operation desired. The output of logic gate 152a is coupled to a second logic gate 154a, which may be an OR gate coupled to perform a logical OR between the output of first logic gate 152$_a$ and a special constant, which may be all zeros or ones, depending on a given implementation. Note that similar logic gates 152$_b$ and 154$_b$ are coupled to receive an input from a corresponding fourth multiplexer 135 and the input from controller 155. Of course, similar logic circuitry is coupled to receive inputs from the other ones of third muxes 130 and fourth muxes 135.

In turn, a third level of selectors including fifth multiplexers 140$_a$-140$_h$ (generically fifth multiplexer 140) may be coupled to receive the outputs from data manipulator 150 and controlled to provide an output to a driver 160. As shown in FIG. 2, fifth muxes 140 may be 2:1 muxes as a result of the logic present in data manipulator 150. In various implementations, controller 155 may provide control signals to control fifth multiplexers 140.

Figure 3:
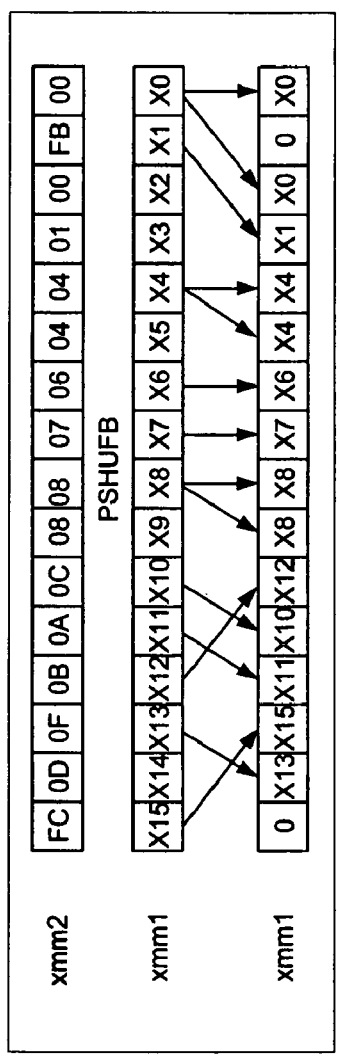
FIG. 3 illustrates an example of inputs and outputs of a shuffle unit performing a shuffle instruction in accordance with an embodiment of the present invention.

Referring now to FIG. 3, shown is an example of inputs and outputs of a shuffle unit performing a shuffle instruction in accordance with an embodiment of the present invention. As shown in the embodiment of FIG. 3, the shuffle instruction may be a packed byte-based shuffle instruction PSHUFB. Using this instruction, a byte-based shuffle may be performed. Furthermore, predetermined values, e.g., constants may be selected for given bytes of the result.

Specifically, as shown in FIG. 3, a first source operand S1, which may be obtained from a register or from memory, is denoted as XMM1. In the embodiment of FIG. 3 first source operand S1 may be 128 bits, although the scope of the present invention is not limited in this regard. A second source operand S2, which may be obtained from a register or memory (denoted as XMM2 in FIG. 3) may provide controls for shuffling of the data bytes of first source operand S1 into locations in the destination, which may also correspond to XMM1. As shown, individual bytes of the first source operand may be shuffled based on controls in the individual corresponding bytes of the second data operand.

Using a shuffle unit in accordance with an embodiment of the present invention and based on the nature of this instruction, both high and low portions of first source operand S1 may be selected in the first level selectors. Then each byte-level multiplexer in the second level selectors may perform a selection based on the lower three bits of the corresponding byte in second data operand S2 (which may be provided as immediate data). Finally, the third level selectors may be controlled to select an output of the first or second byte multiplexers for a given byte from the second level. Note that in the example of FIG. 3 for certain bytes (i.e., bytes 1 and 15) a constant may be applied according to control logic that controls the third level multiplexers. In this way, this local control-type instruction may be executed in an execution unit in a single cycle.

In one embodiment, another shuffle instruction may be a SHUFPS which can shuffle any one of multiple (e.g., four) single floating point (FP) numbers from a first source operand to the lower two destination fields of a destination location and generate the upper two destination fields from of any one of multiple (e.g., four) single FP numbers from a second source operand. An immediate value may be used as a control word to indicate how the data elements are to be shuffled. More specifically, predetermined bits of the control word may indicate which of the four data elements in the first operand are shuffled into the first or lowest data element of the destination register via local control signals generated by a local controller.

Similarly, global-type instructions may also be executed in an execution unit in a single cycle. For example, an alignment instruction, e.g., a packed data shift align (PALIGNR) instruction may be used to concatenate two 128-bits source operands and shift them into a 128-bit destination location under control of a shift count carried by an immediate. In one embodiment, a portion of the immediate data may be used to select the higher or lower bits, and the source one operand or source two operand in the first level multiplexers.

Note that because this instruction may use the source one operand's higher bytes (i.e., S1H) and the source two operand's lower bytes (i.e., S2L) at the same time, implementation of the 3:1 muxes (e.g., first level selector 20a of FIG. 1) in the first selector level may allow this simultaneous selection of both S1H data and S2L data.

To select what data to output from the second and third level multiplexers, additional immediate data corresponding to the shift count, i.e., a global control, may be mapped onto local control signals to enable selection of the appropriate data out of the shuffle unit. Shown in Table 1 below is an example of a packed data shift align operation. In Table 1, two data operands, namely a first data operand (S1) having bytes 0-15 can be concatenated with a second data operand (S2) having bytes 16-31. The particular output depends on the shift count. Thus as shown in Table 1 depending on the shift count (e.g., from zero to 31), the selected bytes may be output from the shuffle unit to generate a 128-bit result.

TABLE 1

| s2 | | | | | | | | | | | | | | | | s1 | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | | | | | | | | | | | | | | | | | | |
| | | | | | | | | | | | | | | | | 15 | 14 | 13 | 12 | 11 | 10 | 9 | 8 | 7 | 6 | 5 | 4 | 3 | 2 | 1 | 0 | SHR Count | |
| | | | | | | | | | | | | | | | | 15 | 14 | 13 | 12 | 11 | 10 | 9 | 8 | 7 | 6 | 5 | 4 | 3 | 2 | 1 | 0 | 0 | 00000 |
| | | | | | | | | | | | | | | | 16 | 15 | 14 | 13 | 12 | 11 | 10 | 9 | 8 | 7 | 6 | 5 | 4 | 3 | 2 | 1 | | 1 | 00001 |
| | | | | | | | | | | | | | | 17 | 16 | 15 | 14 | 13 | 12 | 11 | 10 | 9 | 8 | 7 | 6 | 5 | 4 | 3 | 2 | | | 2 | 00010 |
| | | | | | | | | | | | | | 18 | 17 | 16 | 15 | 14 | 13 | 12 | 11 | 10 | 9 | 8 | 7 | 6 | 5 | 4 | 3 | | | | 3 | 00011 |
| | | | | | | | | | | | | 19 | 18 | 17 | 16 | 15 | 14 | 13 | 12 | 11 | 10 | 9 | 8 | 7 | 6 | 5 | 4 | | | | | 4 | 00100 |
| | | | | | | | | | | | 20 | 19 | 18 | 17 | 16 | 15 | 14 | 13 | 12 | 11 | 10 | 9 | 8 | 7 | 6 | 5 | | | | | | 5 | 00101 |
| | | | | | | | | | | 21 | 20 | 19 | 18 | 17 | 16 | 15 | 14 | 13 | 12 | 11 | 10 | 9 | 8 | 7 | 6 | | | | | | | 6 | 00110 |
| | | | | | | | | | 22 | 21 | 20 | 19 | 18 | 17 | 16 | 15 | 14 | 13 | 12 | 11 | 10 | 9 | 8 | 7 | | | | | | | | 7 | 00111 |
| | | | | | | | | 23 | 22 | 21 | 20 | 19 | 18 | 17 | 16 | 15 | 14 | 13 | 12 | 11 | 10 | 9 | 8 | | | | | | | | | 8 | 01000 |
| | | | | | | | 24 | 23 | 22 | 21 | 20 | 19 | 18 | 17 | 16 | 15 | 14 | 13 | 12 | 11 | 10 | 9 | | | | | | | | | | 9 | 01001 |

TABLE 1-continued

| 31 | 30 | 29 | 28 | 27 | 26 | 25 | 24 | 23 | 22 | 21 | 20 | 19 | 18 | 17 | 16 | | |
|---|---|---|---|---|---|---|---|---|---|---|---|---|---|---|---|---|---|
| | | | | | | | | s1 | | | | | | | | | |
| 15 | 14 | 13 | 12 | 11 | 10 | 9 | 8 | 7 | 6 | 5 | 4 | 3 | 2 | 1 | 0 | SHR | Count |
| 25 | 24 | 23 | 22 | 21 | 20 | 19 | 18 | 17 | 16 | 15 | 14 | 13 | 12 | 11 | 10 | 10 | 01010 |
| 26 | 25 | 24 | 23 | 22 | 21 | 20 | 19 | 18 | 17 | 16 | 15 | 14 | 13 | 12 | 11 | 11 | 01011 |
| 27 | 26 | 25 | 24 | 23 | 22 | 21 | 20 | 19 | 18 | 17 | 16 | 15 | 14 | 13 | 12 | 12 | 01100 |
| 28 | 27 | 26 | 25 | 24 | 23 | 22 | 21 | 20 | 19 | 18 | 17 | 16 | 15 | 14 | 13 | 13 | 01101 |
| 29 | 28 | 27 | 26 | 25 | 24 | 23 | 22 | 21 | 20 | 19 | 18 | 17 | 16 | 15 | 14 | 14 | 01110 |
| 30 | 29 | 28 | 27 | 26 | 25 | 24 | 23 | 22 | 21 | 20 | 19 | 18 | 17 | 16 | 15 | 15 | 01111 |
| 31 | 30 | 29 | 28 | 27 | 26 | 25 | 24 | 23 | 22 | 21 | 20 | 19 | 18 | 17 | 16 | 16 | 10000 |
| 0 | 31 | 30 | 29 | 28 | 27 | 26 | 25 | 24 | 23 | 22 | 21 | 20 | 19 | 18 | 17 | 17 | 10001 |
| 0 | 0 | 31 | 30 | 29 | 28 | 27 | 26 | 25 | 24 | 23 | 22 | 21 | 20 | 19 | 18 | 18 | 10010 |
| 0 | 0 | 0 | 31 | 30 | 29 | 28 | 27 | 26 | 25 | 24 | 23 | 22 | 21 | 20 | 19 | 19 | 10011 |
| 0 | 0 | 0 | 0 | 31 | 30 | 29 | 28 | 27 | 26 | 25 | 24 | 23 | 22 | 21 | 20 | 20 | 10100 |
| 0 | 0 | 0 | 0 | 0 | 31 | 30 | 29 | 28 | 27 | 26 | 25 | 24 | 23 | 22 | 21 | 21 | 10101 |
| 0 | 0 | 0 | 0 | 0 | 0 | 31 | 30 | 29 | 28 | 27 | 26 | 25 | 24 | 23 | 22 | 22 | 10110 |
| 0 | 0 | 0 | 0 | 0 | 0 | 0 | 31 | 30 | 29 | 28 | 27 | 26 | 25 | 24 | 23 | 23 | 10111 |
| 0 | 0 | 0 | 0 | 0 | 0 | 0 | 0 | 31 | 30 | 29 | 28 | 27 | 26 | 25 | 24 | 24 | 11000 |
| 0 | 0 | 0 | 0 | 0 | 0 | 0 | 0 | 0 | 31 | 30 | 29 | 28 | 27 | 26 | 25 | 25 | 11001 |
| 0 | 0 | 0 | 0 | 0 | 0 | 0 | 0 | 0 | 0 | 31 | 30 | 29 | 28 | 27 | 26 | 26 | 11010 |
| 0 | 0 | 0 | 0 | 0 | 0 | 0 | 0 | 0 | 0 | 0 | 31 | 30 | 29 | 28 | 27 | 27 | 11011 |
| 0 | 0 | 0 | 0 | 0 | 0 | 0 | 0 | 0 | 0 | 0 | 0 | 31 | 30 | 29 | 28 | 28 | 11100 |
| 0 | 0 | 0 | 0 | 0 | 0 | 0 | 0 | 0 | 0 | 0 | 0 | 0 | 31 | 30 | 29 | 29 | 11101 |
| 0 | 0 | 0 | 0 | 0 | 0 | 0 | 0 | 0 | 0 | 0 | 0 | 0 | 0 | 31 | 30 | 30 | 11110 |
| 0 | 0 | 0 | 0 | 0 | 0 | 0 | 0 | 0 | 0 | 0 | 0 | 0 | 0 | 0 | 31 | 31 | 11111 |
| 0 | 0 | 0 | 0 | 0 | 0 | 0 | 0 | 0 | 0 | 0 | 0 | 0 | 0 | 0 | 0 | >=32 | |

To effect this shift operation, the control signals shown in Table 2 below for various count values may be present. Specifically, the first level and third level controls are shown. The columns of Table 2 listed as "2 to 1 hi" through the column listed as "3 to 1 lo" correspond to the first level selectors, while the column listed as "3 to 1 [15]" correspond to controls for the third level. Of course other implementations are possible.

TABLE 2

| SHR | Count | | 2 to 1 hi | 3 to 1 hi | 2 to 1 lo | 3 to 1 lo | I3 to 1[15] | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|
| 0 | 00000 | s1h; s1l | 0 | 2 | 1 | 1 | 0 | 0 | 0 | 0 | 0 | 0 | 0 | 0 | 0 | 0 | 0 | 0 | 0 | 0 | 0 | 0 |
| 1 | 00001 | s2l, s1h; s1h, s1h | 0 | 2 | 1 | 1 | 1 | 0 | 0 | 0 | 0 | 0 | 0 | 0 | 1 | 0 | 0 | 0 | 0 | 0 | 0 | 0 |
| 2 | 00010 | s2l, s1h; s1h, s1h | 0 | 2 | 1 | 1 | 1 | 1 | 0 | 0 | 0 | 0 | 0 | 0 | 1 | 1 | 0 | 0 | 0 | 0 | 0 | 0 |
| 3 | 00011 | s2l, s1h; s1h, s1h | 0 | 2 | 1 | 1 | 1 | 1 | 1 | 0 | 0 | 0 | 0 | 0 | 1 | 1 | 1 | 0 | 0 | 0 | 0 | 0 |
| 4 | 00100 | s2l, s1h; s1h, s1h | 0 | 2 | 1 | 1 | 1 | 1 | 1 | 1 | 0 | 0 | 0 | 0 | 1 | 1 | 1 | 1 | 0 | 0 | 0 | 0 |
| 5 | 00101 | s2l, s1h; s1h, s1h | 0 | 2 | 1 | 1 | 1 | 1 | 1 | 1 | 1 | 0 | 0 | 0 | 1 | 1 | 1 | 1 | 1 | 0 | 0 | 0 |
| 6 | 00110 | s2l, s1h; s1h, s1h | 0 | 2 | 1 | 1 | 1 | 1 | 1 | 1 | 1 | 1 | 0 | 0 | 1 | 1 | 1 | 1 | 1 | 1 | 0 | 0 |
| 7 | 00111 | s2l, s1h; s1h, s1h | 0 | 2 | 1 | 1 | 1 | 1 | 1 | 1 | 1 | 1 | 1 | 0 | 1 | 1 | 1 | 1 | 1 | 1 | 1 | 0 |
| 8 | 01000 | s2l; s1h | 0 | 0 | 1 | 2 | 1 | 1 | 1 | 1 | 1 | 1 | 1 | 1 | 1 | 1 | 1 | 1 | 1 | 1 | 1 | 1 |
| 9 | 01001 | s2h, s2l; s2l, s1h | 0 | 0 | 1 | 2 | 0 | 1 | 1 | 1 | 1 | 1 | 1 | 1 | 0 | 1 | 1 | 1 | 1 | 1 | 1 | 1 |
| 10 | 01010 | s2h, s2l; s2l, s1h | 0 | 0 | 1 | 2 | 0 | 0 | 1 | 1 | 1 | 1 | 1 | 1 | 0 | 0 | 1 | 1 | 1 | 1 | 1 | 1 |
| 11 | 01011 | s2h, s2l; s2l, s1h | 0 | 0 | 1 | 2 | 0 | 0 | 0 | 1 | 1 | 1 | 1 | 1 | 0 | 0 | 0 | 1 | 1 | 1 | 1 | 1 |
| 12 | 01100 | s2h, s2l; s2l, s1h | 0 | 0 | 1 | 2 | 0 | 0 | 0 | 0 | 1 | 1 | 1 | 1 | 0 | 0 | 0 | 0 | 1 | 1 | 1 | 1 |
| 13 | 01101 | s2h, s2l; s2l, s1h | 0 | 0 | 1 | 2 | 0 | 0 | 0 | 0 | 0 | 1 | 1 | 1 | 0 | 0 | 0 | 0 | 0 | 1 | 1 | 1 |
| 14 | 01110 | s2h, s2l; s2l, s1h | 0 | 0 | 1 | 2 | 0 | 0 | 0 | 0 | 0 | 0 | 1 | 1 | 0 | 0 | 0 | 0 | 0 | 0 | 1 | 1 |
| 15 | 01111 | s2h, s2l; s2l, s1h | 0 | 0 | 1 | 2 | 0 | 0 | 0 | 0 | 0 | 0 | 0 | 1 | 0 | 0 | 0 | 0 | 0 | 0 | 0 | 1 |
| 16 | 10000 | s2h; s2l | 0 | 0 | 0 | 0 | 0 | 0 | 0 | 0 | 0 | 0 | 0 | 0 | 1 | 1 | 1 | 1 | 1 | 1 | 1 | 1 |
| 17 | 10001 | s2h; s2l, s2h | 0 | 0 | 0 | 0 | 2 | 0 | 0 | 0 | 0 | 0 | 0 | 0 | 1 | 1 | 1 | 1 | 1 | 1 | 1 | 1 |
| 18 | 10010 | s2h; s2l, s2h | 0 | 0 | 0 | 0 | 2 | 2 | 0 | 0 | 0 | 0 | 0 | 0 | 0 | 1 | 1 | 1 | 1 | 1 | 1 | 1 |
| 19 | 10011 | s2h; s2l, s2h | 0 | 0 | 0 | 0 | 2 | 2 | 2 | 0 | 0 | 0 | 0 | 0 | 0 | 0 | 1 | 1 | 1 | 1 | 1 | 1 |
| 20 | 10100 | s2h; s2l, s2h | 0 | 0 | 0 | 0 | 2 | 2 | 2 | 2 | 0 | 0 | 0 | 0 | 0 | 0 | 0 | 1 | 1 | 1 | 1 | 1 |
| 21 | 10101 | s2h; s2l, s2h | 0 | 0 | 0 | 0 | 2 | 2 | 2 | 2 | 2 | 0 | 0 | 0 | 0 | 0 | 0 | 0 | 1 | 1 | 1 | 1 |
| 22 | 10110 | s2h; s2l, s2h | 0 | 0 | 0 | 0 | 2 | 2 | 2 | 2 | 2 | 2 | 0 | 0 | 0 | 0 | 0 | 0 | 0 | 1 | 1 | 1 |
| 23 | 10111 | s2h; s2l, s2h | 0 | 0 | 0 | 0 | 2 | 2 | 2 | 2 | 2 | 2 | 2 | 0 | 0 | 0 | 0 | 0 | 0 | 0 | 1 | 1 |
| 24 | 11000 | x; s2h | 0 | 0 | 0 | 0 | 2 | 2 | 2 | 2 | 2 | 2 | 2 | 2 | 0 | 0 | 0 | 0 | 0 | 0 | 0 | 1 |
| 25 | 11001 | x; s2h | 0 | 0 | 0 | 0 | 2 | 2 | 2 | 2 | 2 | 2 | 2 | 2 | 2 | 0 | 0 | 0 | 0 | 0 | 0 | 0 |
| 26 | 11010 | x; s2h | 0 | 0 | 0 | 0 | 2 | 2 | 2 | 2 | 2 | 2 | 2 | 2 | 2 | 2 | 0 | 0 | 0 | 0 | 0 | 0 |
| 27 | 11011 | x; s2h | 0 | 0 | 0 | 0 | 2 | 2 | 2 | 2 | 2 | 2 | 2 | 2 | 2 | 2 | 2 | 0 | 0 | 0 | 0 | 0 |
| 28 | 11100 | x; s2h | 0 | 0 | 0 | 0 | 2 | 2 | 2 | 2 | 2 | 2 | 2 | 2 | 2 | 2 | 2 | 2 | 0 | 0 | 0 | 0 |
| 29 | 11101 | x; s2h | 0 | 0 | 0 | 0 | 2 | 2 | 2 | 2 | 2 | 2 | 2 | 2 | 2 | 2 | 2 | 2 | 2 | 0 | 0 | 0 |
| 30 | 11110 | x; s2h | 0 | 0 | 0 | 0 | 2 | 2 | 2 | 2 | 2 | 2 | 2 | 2 | 2 | 2 | 2 | 2 | 2 | 2 | 0 | 0 |
| 31 | 11111 | x; s2h | 0 | 0 | 0 | 0 | 2 | 2 | 2 | 2 | 2 | 2 | 2 | 2 | 2 | 2 | 2 | 2 | 2 | 2 | 2 | 0 |
| >=32 | | | | | | | 2 | 2 | 2 | 2 | 2 | 2 | 2 | 2 | 2 | 2 | 2 | 2 | 2 | 2 | 2 | 2 |

Figure 4:
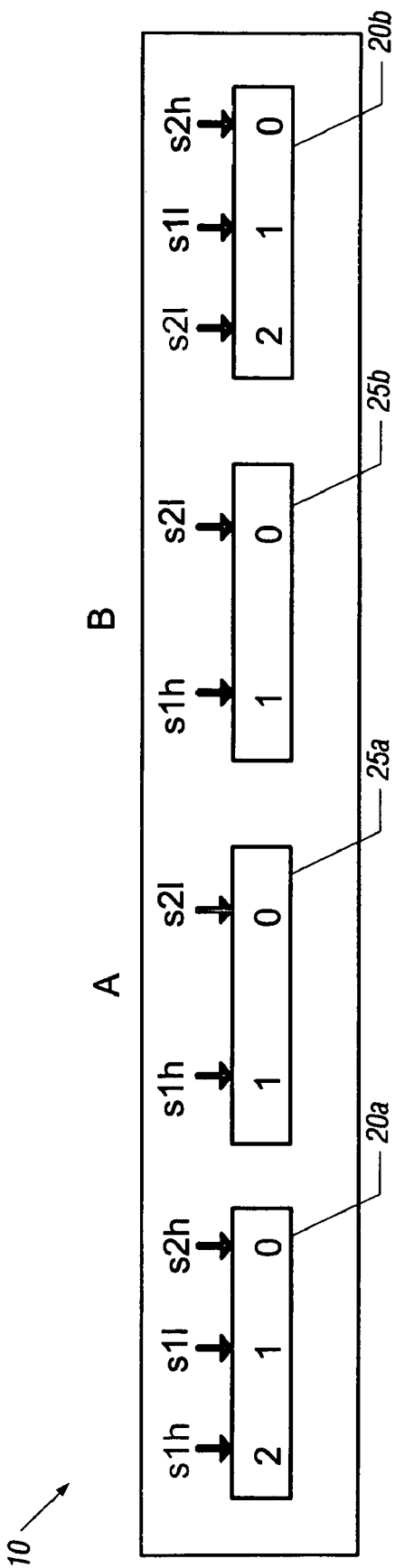
FIG. 4 is a block diagram of a first level of selectors of an execution unit in accordance with an embodiment of the present invention.

Note that the controls shown in Table 2 for the first four columns (i.e., "2 to 1 hi" to "3 to 1 lo") may map to provide outputs from the first level of selectors shown in FIG. 4. Specifically, FIG. 4 shows a block diagram of first level multiplexers, configured the same as that of FIG. 1 and the various control signals used to enable output of the corresponding portions of the source operands to perform a shift align instruction.

Figure 5:
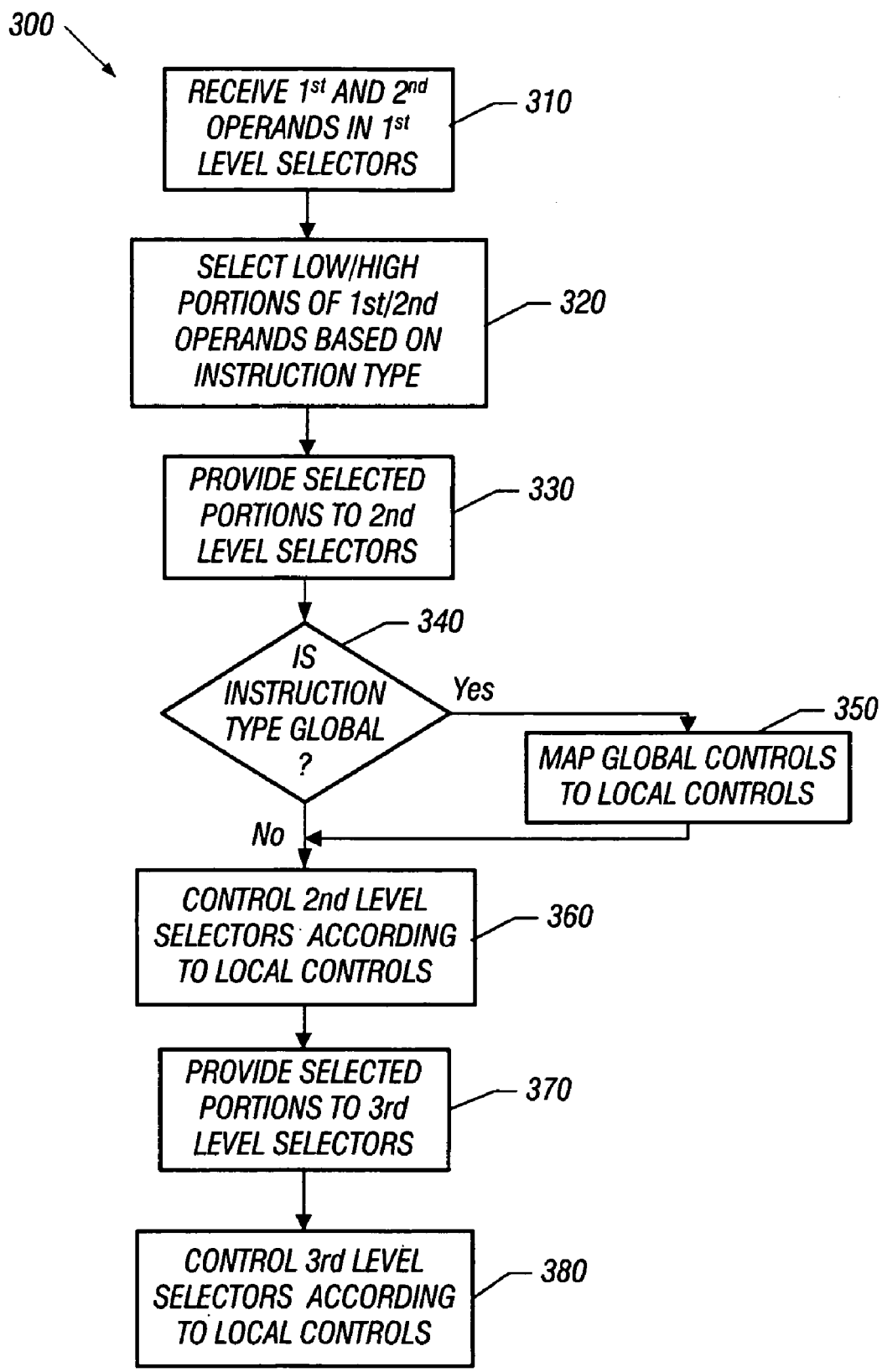
FIG. 5 is a flow diagram of a method in accordance with an embodiment of the present invention.

Referring now to FIG. 5, shown is a flow diagram of a method in accordance with an embodiment of the present invention. As shown in FIG. 5, method 300 may be used to perform an operation in an execution unit. Method 300 may begin by receiving first and second data operands in first level selectors of an execution unit (block 310). The source operands may be present in processor registers or one or the other may be obtained from memory. This data may follow an opcode for the instruction. Based on the opcode, which identifies the type of operation to be performed, given portions of the operands may be selected in the first level selectors. More specifically, selected high/low portions of the first and/or second operands may be selected based on the instruction type (block 320). The selected portions may then be provided to second level selectors (block 330). Then it may be determined whether the instruction type is a global type (diamond 340). Note that while shown as occurring after blocks 310-330, the determination of the type of operation may be performed in parallel with these steps.

If it is determined that the operation is a global type operation, control passes to block 350, where the global controls may be mapped to local controls. Note that such mapping may occur in parallel with processing in the first level selectors. From either of blocks 350 and diamond 340, control passes to block 360. There, the second level selectors may be controlled according to the local controls (block 360). To obtain the desired result, the outputs of the second level selectors may be provided to third level selectors (block 370). Finally, the output of the third level selectors may be determined according to the local controls (block 380). In this way, various instructions may be performed in an execution unit according to a single μop in a single cycle.

In various embodiments, instructions to be implemented in an execution unit may include move instructions, shuffle instructions, add instructions, multiply instructions, and so forth. While the operations described herein are performed on 128-bit packed data operands, an execution unit can operate on packed data in several different packed data formats. For example, in one embodiment, packed data can be operated on in one of three formats: a "packed byte" format (e.g., PADDb), a "packed word" format (e.g., PADDw), or a "packed double word" (dword) format (e.g., PADDd). The packed byte format includes eight separate 8-bit data elements; the packed word format includes four separate 16-bit data elements; the packed dword format includes two separate 32-bit data elements. While the operations have been discussed with reference to 128-bit data formats, the instructions may be similarly applied to other packed data formats as well as other types of data operands.

Figure 6:
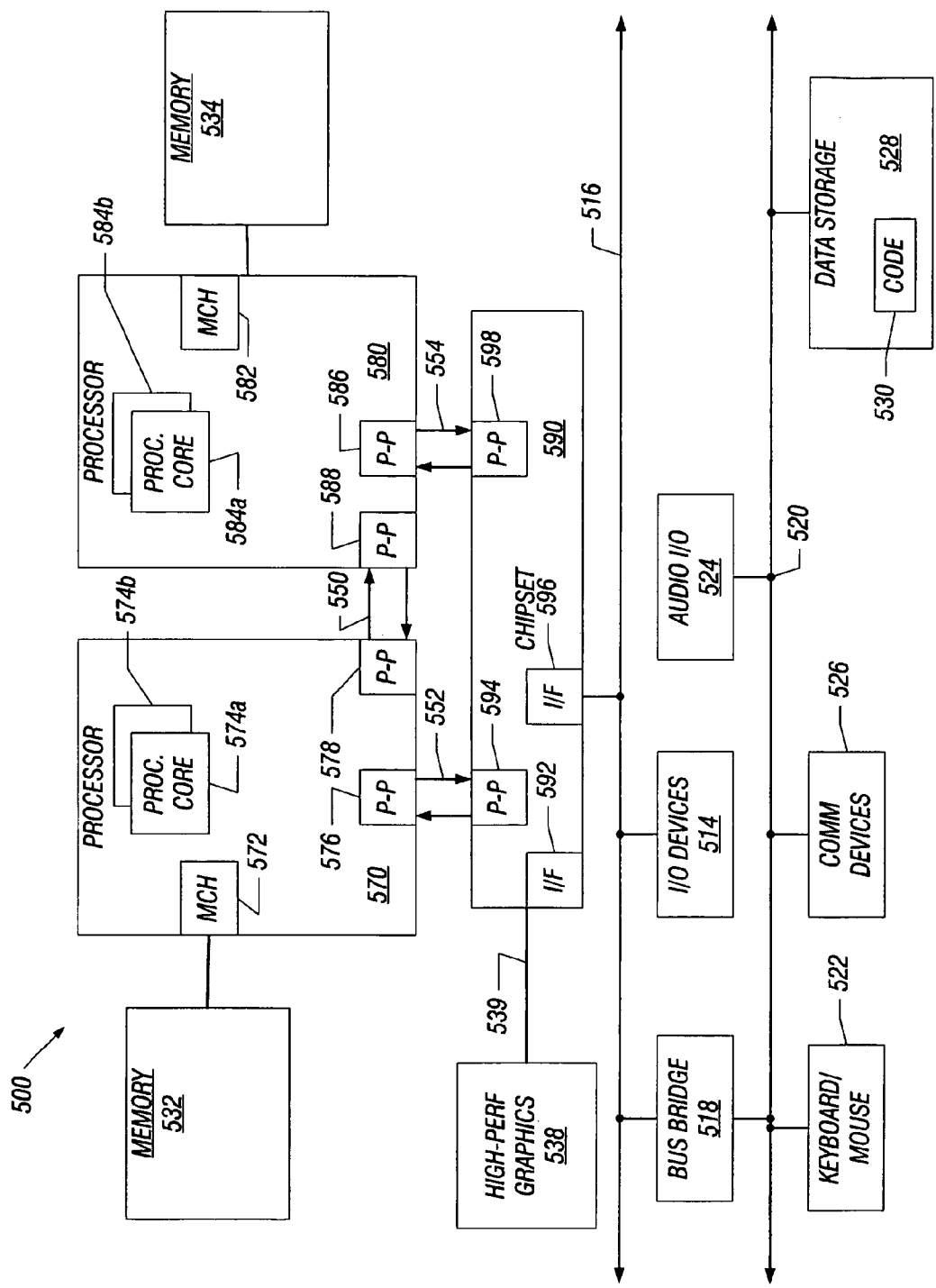
FIG. 6 is a block diagram of a system in accordance with one embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b). The various cores may include execution units in accordance with an embodiment of the present invention. First processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 6, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the *Accelerated Graphics Port Interface Specification, Revision* 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the *PCI Local Bus Specification, Production Version, Revision* 2.1, dated June 1995 or a bus such as a PCI Express bus or another third generation input/output (I/O) interconnect bus, although the scope of the present invention is not so limited.

As shown in FIG. 6, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 6, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
 receiving a first packed data operand and a second packed data operand in a common execution unit that can process shuffle instructions and shift instructions; and manipulating the first packed data operand and the second packed data operand in the common execution unit having a plurality of independent data paths each to receive the first packed data operand and the second packed data operand responsive to a first instruction to generate an output according to local control signals of a local controller of the common execution unit, including providing the first packed data operand and a first portion of the second packed data operand to first multiplexers of a first selector level of a first independent data path of the common execution unit, providing a first portion of the first packed data operand and a second portion of the second packed data operand to second multiplexers of the first selector level of the first independent data path, providing the first portion of the first packed data operand and the second portion of the second packed data operand to second multiplexers of a first selector level of a second independent data path of the common execution unit, and providing a second portion of the first packed data operand and the second packed data operand to first multiplexers of the first selector level of the second independent data path, and selecting an output of the first selector level of the first and second independent data paths including selected portions of the first and second packed data operands based on a type of the first instruction.

2. The method of claim 1, further comprising mapping global control signals of the first instruction in the local controller to provide the local control signals to generate the output.

3. The method of claim 1, further comprising generating the output responsive to the first instruction in a single cycle.

4. The method of claim 1, further comprising manipulating a third packed data operand and a fourth packed data operand in the common execution unit responsive to a second instruction, wherein the second instruction is of a different type than the first instruction.

5. The method of claim 4, wherein the first instruction comprises a shuffle operation and the second instruction comprises a shift operation.

6. An apparatus comprising:
an execution unit to perform an operation on a first data operand and a second data operand, the execution unit including:
a first level of first multiplexers to receive the first data operand and a first portion of the second data operand, and a first level of second multiplexers to receive a first portion of the first data operand and a second portion of the second data operand, the first level of first and second multiplexers to output selected portions of the first and second data operands;
a second level of third multiplexers to receive outputs of the first level of first multiplexers and a second level of fourth multiplexers to receive outputs of the first level of second multiplexers, the second level of third and fourth multiplexers to output selected portions of the first and second data operands;
a data manipulator coupled to the second level of third and fourth multiplexers to manipulate outputs therefrom, based on local control signals, the data manipulator including a plurality of logic gates to perform logic operations on the outputs from the second level of third and fourth multiplexers; and
a third level of multiplexers coupled to an output of the data manipulator, wherein the third level of multiplexers is to output a result of the operation; and
a controller coupled to the execution unit to provide the local control signals to control the execution unit, wherein the controller is to map incoming global control signals to match relative position selection associated with the operation onto the local control signals to match absolute position selection.

7. The apparatus of claim 6, further comprising a set of selectors to provide the first data operand and the second data operand to the first level of the first and second multiplexers.

8. The apparatus of claim 6, wherein the controller is to receive a plurality of different instructions and to decode the plurality of different instructions for execution of each of the plurality of different instructions in the execution unit in a single cycle.

9. The apparatus of claim 6, wherein the execution unit comprises a shuffle unit to perform shuffle instructions and shift instructions, the shuffle unit having at least two independent data paths each to receive the first data operand and the second data operand.

10. The apparatus of claim 6, wherein the global control signals are to be applied to all fields of the first data operand and the second data operand.

11. The apparatus of claim 10, wherein the local control signals are to be applied to the first data operand and the second data operand on a per field basis.

12. A system comprising:
an execution unit having two data paths each to receive a first source operand and a second source operand, each data path having:
a first selector level to receive the first source operand and the second source operand and to select portions for output based on a type of operation;
a second selector level to receive the output of the first selector level, wherein the second selector level is to be controlled by local control signals each associated with one of a plurality of data fields of a result;
a data manipulator coupled to the second selector level to manipulate outputs therefrom based on the local control signals, the data manipulator including a plurality of logic gates to perform logic operations on the outputs from the second selector level; and
a third selector level to receive an output of the data manipulator and to output a result of the operation; and
a dynamic random access memory (DRAM) coupled to the execution unit.

13. The system of claim 12, further comprising a controller to decode an immediate value to generate the local control signals.

14. The system of claim 13, wherein the controller is to map incoming global control signals onto the local control signals.

15. The system of claim 12, wherein the execution unit is to handle a shuffle operation or a shift operation in a single cycle.

16. The system of claim 15, further comprising a controller to decode an immediate value associated with each of the plurality of data fields for the shuffle operation to generate the local control signals, and to map a shift count for the shift operation onto the local control signals.

17. The method of claim 1, wherein the first multiplexers are 3:1 multiplexers and the second multiplexers are 2:1 multiplexers.

18. The method of claim 1, further comprising selecting an output of a second selector level of the common execution unit based on the local control signals.

19. The system of claim 12, wherein the third selector level is to select between the output of the second level selector or a set value, the set value generated based on control signals received with an instruction, on a per data field basis to generate the result.

20. An apparatus comprising:

a processor including a first execution unit to perform a shuffle instruction on a first data operand and a second data operand, the first execution unit including a first level of first multiplexers to receive the first data operand and a first portion of the second data operand, and a first level of second multiplexers to receive a first portion of the first data operand and a second portion of the second data operand, the first level of first and second multiplexers to output selected portions of the first and second data operands, a second level of third multiplexers to receive outputs of the first level of first multiplexers and a second level of fourth multiplexers to receive outputs of the first level of second multiplexers, the second level of third and fourth multiplexers to output selected portions of the first and second data operands, a data manipulator coupled to the second level of third and fourth multiplexers to manipulate outputs therefrom, based on local control signals, the data manipulator including a plurality of logic gates to perform logic operations on the outputs from the second level of third and fourth multiplexers, and a third level of multiplexers coupled to an output of the data manipulator, wherein the third level of multiplexers is to output a result of the shuffle instruction, the processor further including a controller to provide the local control signals to control the first execution unit.

21. The apparatus of claim 20, wherein the processor further includes a memory controller.

22. The apparatus of claim 20, wherein the processor comprises a multicore processor including a first core and a second core, wherein the first execution unit is included within the first core.

23. The apparatus of claim 20, wherein the first data operand and the second data operand comprise packed data operands.

24. The apparatus of claim 20, wherein the shuffle instruction is to enable a byte-based shuffle to be performed and to provide for selection of one or more constants for given bytes of the result.

* * * * *